US011475206B1

(12) United States Patent  (10) Patent No.: US 11,475,206 B1
Smith et al.  (45) Date of Patent: Oct. 18, 2022

(54) TOOL FOR THE CREATION AND EDITING OF WEB PAGE CONTENT

(71) Applicants: Kirby Smith, Knoxville, TN (US); Harrison Frolick, Brentwood, TN (US)

(72) Inventors: Kirby Smith, Knoxville, TN (US); Harrison Frolick, Brentwood, TN (US)

(73) Assignee: Lead Symphony, Inc.

( * ) Notice: Subject to any disclaimer, the term of this patent is extended or adjusted under 35 U.S.C. 154(b) by 0 days.

(21) Appl. No.: 17/209,189

(22) Filed: Mar. 22, 2021

Related U.S. Application Data

(60) Provisional application No. 62/992,775, filed on Mar. 20, 2020.

(51) Int. Cl.
| | | |
|---|---|---|
| *G06F 17/00* | (2019.01) | |
| *G06F 40/14* | (2020.01) | |
| *G06F 16/958* | (2019.01) | |
| *G06F 8/34* | (2018.01) | |
| *G06F 3/0486* | (2013.01) | |
| *H04L 9/40* | (2022.01) | |
| *G06F 3/04845* | (2022.01) | |
| *G06F 16/951* | (2019.01) | |

(52) U.S. Cl.
CPC ............ *G06F 40/14* (2020.01); *G06F 3/0486* (2013.01); *G06F 3/04845* (2013.01); *G06F 8/34* (2013.01); *G06F 16/951* (2019.01); *G06F 16/986* (2019.01); *H04L 63/102* (2013.01)

(58) Field of Classification Search
CPC .... G06F 40/14; G06F 3/04845; G06F 16/986; G06F 8/34; G06F 3/0486; G06F 16/951; H04L 63/102

USPC ......................................................... 715/234
See application file for complete search history.

(56) References Cited

U.S. PATENT DOCUMENTS

| | | | |
|---|---|---|---|
| 9,319,813 B2* | 4/2016 | Edgar .................... H04R 25/70 |
| 9,720,964 B1* | 8/2017 | Hansen ............... G06F 16/2453 |
| 9,754,043 B2* | 9/2017 | Parker .................. G06F 3/0485 |
| 10,496,716 B2* | 12/2019 | Lytkin ................ G06Q 30/0201 |
| 2008/0082924 A1* | 4/2008 | Pally ....................... G06F 16/957 |
| | | | 715/764 |
| 2009/0300596 A1* | 12/2009 | Tyhurst ..................... G06F 8/65 |
| | | | 717/173 |
| 2016/0328217 A1* | 11/2016 | Hagerty ................ H04L 63/102 |
| 2019/0122335 A1* | 4/2019 | Rasmussen ............. G06T 17/05 |
| 2021/0074417 A1* | 3/2021 | Pierson .................. G06Q 50/26 |

(Continued)

OTHER PUBLICATIONS

Plus2net, 'Collecting the coordinates data inside of an image on click', published 2012 (Year: 2012).*

(Continued)

*Primary Examiner* — Wilson W Tsui
*Assistant Examiner* — Matthew J Ludwig
(74) *Attorney, Agent, or Firm* — Andrew C. Aitken; IP Law Leaders PLLC

(57) ABSTRACT

The system and methods are disclosed to allow web page owners or administrators to create annotated storyboards relating to a user's image wherein a user can drag a pin or marker over an image that has been displayed on the web page which comprises a JavaScript code to a selected location and create a page division that can be accessed by the user to enter or edit data, save the pin and data and publish the image with the pin and associated data allowing third parties to access the webpage and related embedded data.

14 Claims, 15 Drawing Sheets

(Job View with one opened pin - public)

(56) References Cited

U.S. PATENT DOCUMENTS

2021/0117079 A1* 4/2021 Hauenstein ............. G06F 3/016
2021/0149638 A1* 5/2021 McCulloh ................ G06F 8/20

OTHER PUBLICATIONS

Stackoverflow, 'Javascript place marker on image onclick', published 2016 (Year: 2016).*
Toomim, Attaching UI Enhancements to Websites with End Users, CHI 2009—Advanced Web Scenarios, ACM (Year: 2009).*

* cited by examiner (Homepage - Public)

(Homepage - Administration)

LEADSYMPHONY

Add a new Job

*You are adding a new Job*

Title *

305 — [ ]

Featured Image

No image selected  Add Image

Import Information from Jobprogress (optional)

307

( Import from Jobprogress )

309

Description

311 — [ ]

Customer Name

315 — [ ]

Phones

| Label | Phone Number | Extension |
|---|---|---|
| Cell, Home, | (000) 0000 000 | Ext |

317

Add Phone

Customer Email

319 — [ ]

321 Address

Search for address...

| Map | Satelite |

325

Spanish Peaks State Wildlife Area   Boncarbo   Ludlow   25   El Moro   Trinidad

Google

+ −

Logout

[ Add New Job ]

300

FIG. 3
(Add New Job - Admin Only)

(Import Job from JobProgress - Admin Only)

(Job View with one opened pin - Admin)

(Job View with one opened pin - public)

FIG. 7
(Edit Job - Admin Only)

(Add Cover to existing Job - Admin only)

(View / Edit Cover - Admin)

(View Single Cover - Public)

(Managing a pin as an Admin - Admin Only)

(Moving a pin - Admin Only)

(Editing a note from a pin - Admin Only)

(Renaming a cover title - Admin Only)

(Changing the description of Cover - Admin Only)

TOOL FOR THE CREATION AND EDITING OF WEB PAGE CONTENT

CROSS REFERENCE TO RELATED APPLICATIONS

This application claims the benefit of the filing date of U.S. Application No. 62/992,775 filed on Mar. 20, 2020.

BACKGROUND OF THE INVENTION

Field of the Invention

This invention is directed to a software tool that allows user to enter, edit and display content on webpages.

Description of Related Art

While there are many tools available to assist those with limited or no programming skills to present information and data on websites, the options generally remain limited to the use of templates that allow for entry and uploading of text or images.

There are prior art systems that use pins to assist with the presentation of information. For example, in the context of maps there are commercially available systems that allow users to place their own mark or pins to designate locations. For example, in some Google Maps applications, a user may search for an address or scroll around the map until you a location is selected. Next, by effecting a "long-press" on the screen, a pin will drop at the selected location and an address of the location will pop up and be displayed at the bottom of the screen. Prior art systems also have features that allows a "pinned" location to be saved and a user can get directions relevant to the location. In connection with map applications, some prior art systems present additional information relating to the pin locations at the bottom of screen and, usually is associated with the address of the pin. In Google Maps, each pin or marker is associated with a specific location, which is typically the longitude and latitude of the location. By right clicking on the pin, a secondary field appears that has additional information relating to the location of the pin.

Markers that have similar functions as pins, are also used in text. In this regard, it is known to embed text with code that allows for the hyperlinking of a term or phrase to a secondary location such as a website or page division. It is also known to use a JavaScript div instructions in text that is opened when a mouse pointer or curser is positioned to hover over the embedded code. Often the JavaScript code may also be associated with a hyperlink to a separate web page that may be accessed. For example, some pages on the Wikidpedia.com website have text that includes embedded code that allows access to a page division "or window" when embedded code is hovered over by the mouse and also includes a hyperlink to a different webpage when the mouse selects the embedded code. The user is then directed to a secondary web page.

While providing such containers provides an effective manner to present information, the prior art has been generally limited use of such containers to embedded text. Moreover, the creation of such page div containers generally would require a person to have programing skills such as JavaScript and HTML and each container created would have to be separately created and located. Conventional web page hosts such as Word Press and conventional web page templates, do not allow a user to easily incorporate such features.

It is therefore an object of the invention to provide systems and methods to easily and effectively present information on a user's website.

SUMMARY OF THE INVENTION

The present invention relates to systems and methods for improved user integration of content and an administrative framework allowing for user experience management of web pages in a computer-based environment. Described herein, for example, are approaches for improved and effective communication to website users by presenting images or drawings that are overlaid with a plurality of pins, also referred to as markers, at feature locations that direct users to additional information relating to the image feature. More specifically, the present invention is generally directed to multimedia communication and marketing tool that can that allows users to easily and seamlessly create web page divisions using a div tag as well as access to additional pages for a user's website. These page divisions, which may be created in JavaScript allow for a user to locate a page division access or "div element," "page div" or "div block" and associated text, images and multimedia with the location, wherein the primary purpose of displaying information about exemplary jobs and images of completed jobs on the user's website.

The system and methods disclosed can be employed by end users or web page owners to quickly create annotated storyboards relating to a user's project that are image or photograph based. A user can drag a pin or marker over an image or photographs that has been displayed on the website which comprises a JavaScript code, widget or instructions to create a container or page division. The pin or marker may be opened to access and edit the container by activation of the mouse trigger and data, relevant to the image feature at the respective location may be uploaded. As such, the tool allows a user to create a new pin, by selecting an icon on a dashboard under the image and drag the new pin over the image to a desired location. Next, the pin is provided a number or other identification element. Next the user opens a page division window at the pin location that a user can upload or create data. When the window is opened, first a title is given to the file, next the user can upload or create text, upload images and or videos. When the user is satisfied with the content, the information is saved and the page container associated with the pin may be published, allowing third parties to access the webpage and related embedded data.

In the embodiment described the platform that is used is Word Press. In an embodiment, software that is used to create the tool is JavaScript including elements from jQuery, a JavaScript library that can be used to simplify HTMP and which provides capabilities for developers to create plug-ins on top of the JavaScript library jQuery is a free, open-source software using the permissive MIT License. The plug-ins provided allow the easy creation of the GUI container pin, the ability to locate the pin on the image and by dragging and dropping the pin anywhere on the web page, including an image.

While experienced software engineers or programmers may be able create a similar graphical user interfaces using JavaScript or other programing languages, the present invention allows anyone to quickly and effectively create intuitive content on a website with limited or no programming skills. The present invention allows users such as contractors or related professionals who want to communicate effective information and stories about their projects and publish them to their websites.

BRIEF DESCRIPTION OF THE DRAWINGS

FIG. 3 is a screen capture of a website depicting an administrator user interface.

FIG. 7 is a dashboard displayed to a website administrator to allow for the creation and editing of content on a webpage, including an ability to update a job.

DETAILED DESCRIPTION OF EMBODIMENTS OF THE INVENTION

In the embodiment described, the system and methods described herein are implemented as a Word Press plugin in conjunction with a client's pre-existing Word Press website. In order to create and update a website with the pin features overlaid on images as described herein, a user is given access to a user interface as an administrator. The plug-in functionality is dynamically loaded and installed in a place prescribed by the host application, in this case, Word Press. Word Press is an open-source content management system that is typically installed on a web server. Word Press is written in PHP and uses a MySQL or MariaDB database. The Word Press programs may implement plugins, such as the plugin of the invention disclosed herein, by loading the script files written in a scripting language like Python, Lua and JavaScript.

Figure 1:
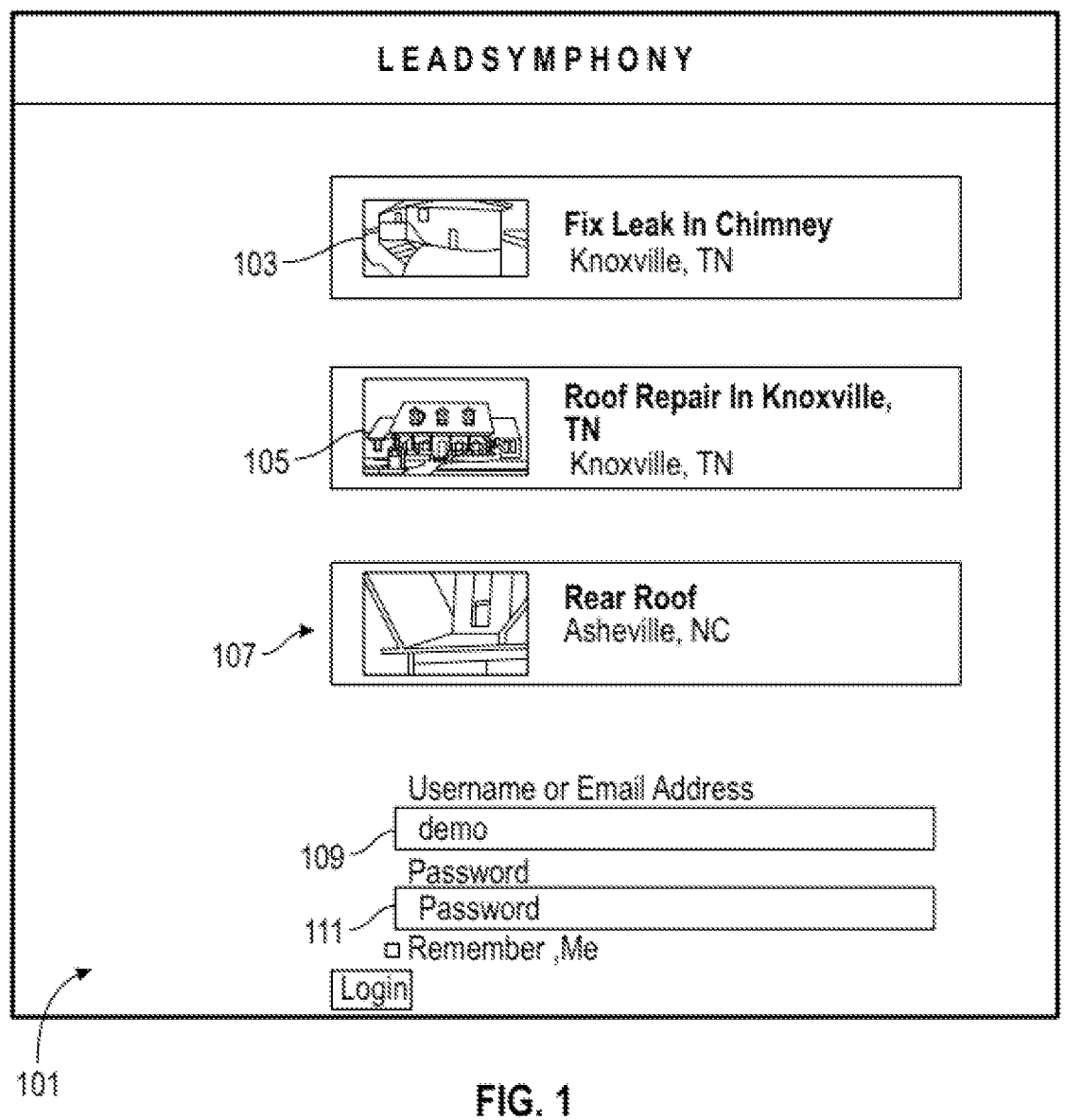
FIG. 1 is a screen capture of a website depicting that can be created with the tool according to the invention including images of job locations.
Figure 2:
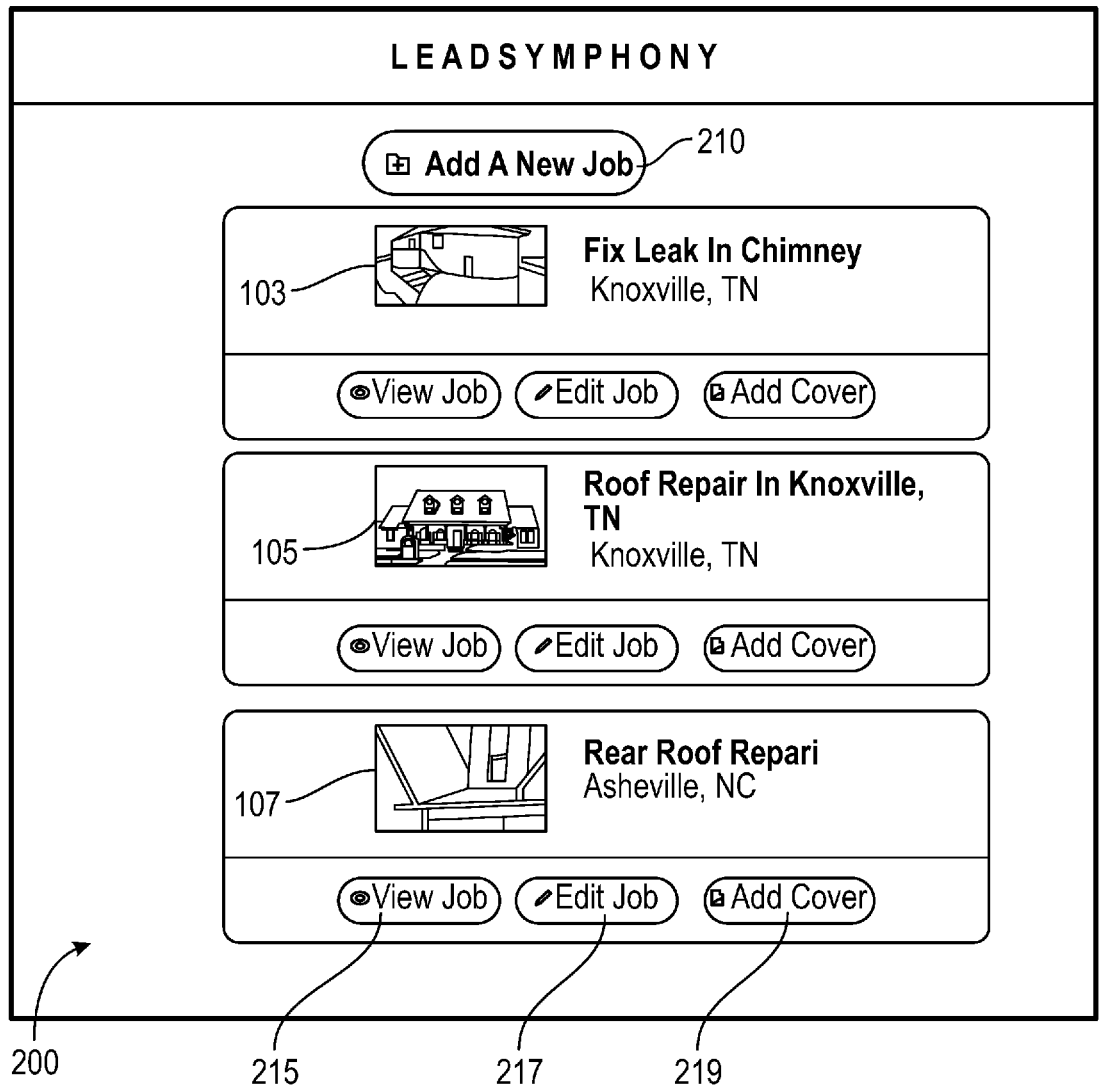
FIG. 2 is a screen capture of a website of an administrative user interface that provides the function of adding a new job to the website.

Now referring to FIG. 1, an illustration of a website screen grab 101 of a website is shown that includes a plurality of projects, including Fix Leak in Chimney of 103, Roof Repair in Knoxville 105, and Roof Repair Rep. 107. A user may sign in with a user name and password and view the website. At FIG. 2, a website screen grab 200 is depicted that is the same website depicted in FIG. 1 that has an interface with administrator privileges and allows and administrator to add a new job 210, and, as seen in connection with the Rear Roof Rep. job 107 the administrator can select to view the job 215, edit the job 217 and add new covers to the job 219. As used herein, a "cover" refers to an image relating to a project, and in the examples depicted in FIGS. 1 and 2 the project is a home improvement job.

FIG. 3 is a webpage 300 displayed to an administrator of a website to enable the creation of a new job to the website, that includes tagged or pinned images. The administrator may enter a title for the job at field 305, upload a featured image at field 307, and additional images may be uploaded at field 309. A description of the job may be added at field 311. Field 315 is for entry of a customer name, field 317 for entry of the customer number, and field 319 for entry of the customer email. Field 321 allows entry of an address for the customer and it will be displayed on map 325. The customer information entered is not published to the website but is only accessible to the administrator.

Figure 4:
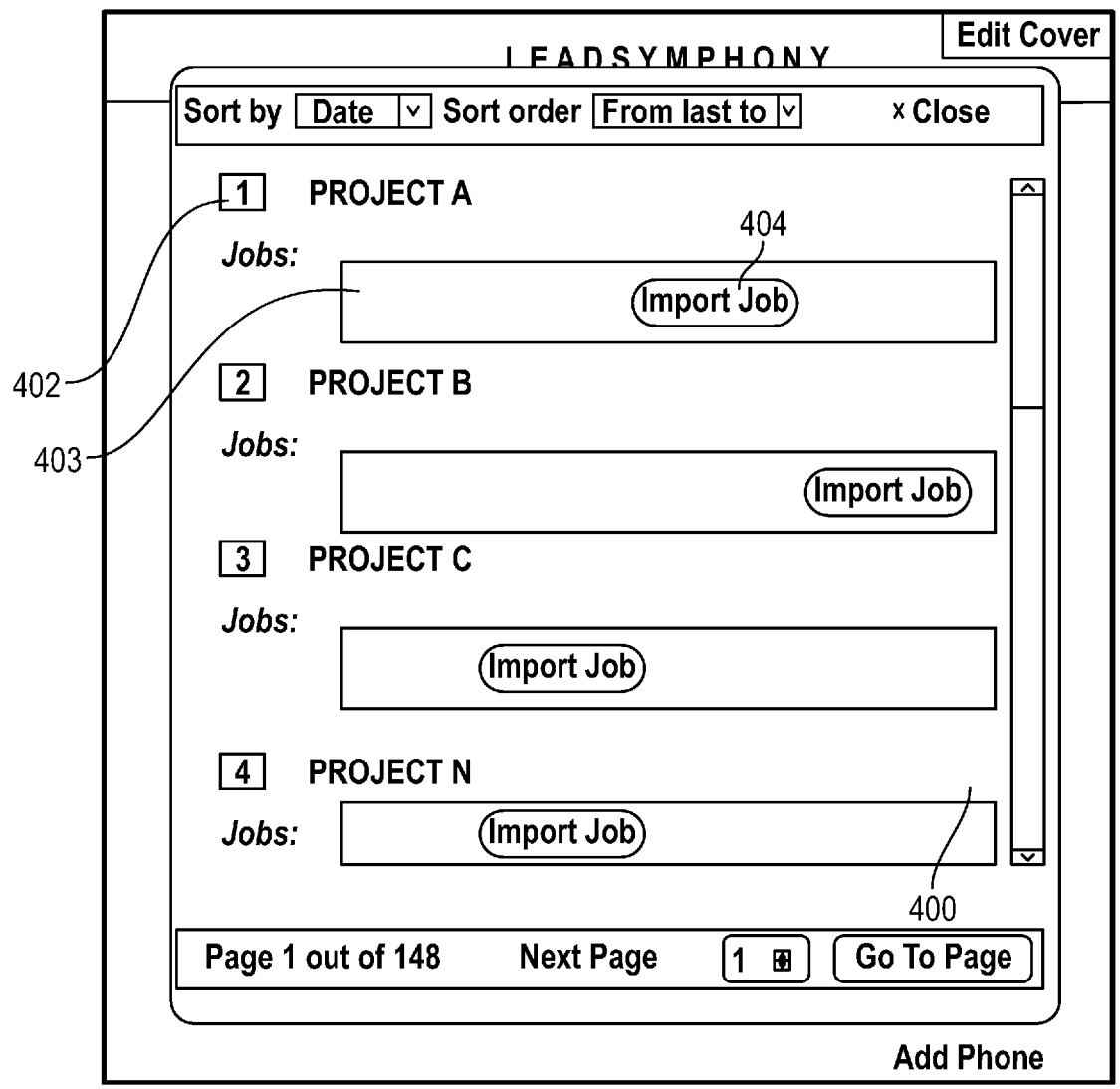
FIG. 4 is a screen capture of a website depicting an administrator user interface that provides the function of the cover photo of FIG. 3 with a container that includes associated information that has been accessed by a website viewer.

FIG. 4 depicts a further screen shot 400 that reflects the job progress update function of the website. As shown, for example, "reference 1" 402 entitled Project A has an import job function 404 in job field 403.

Figure 5:
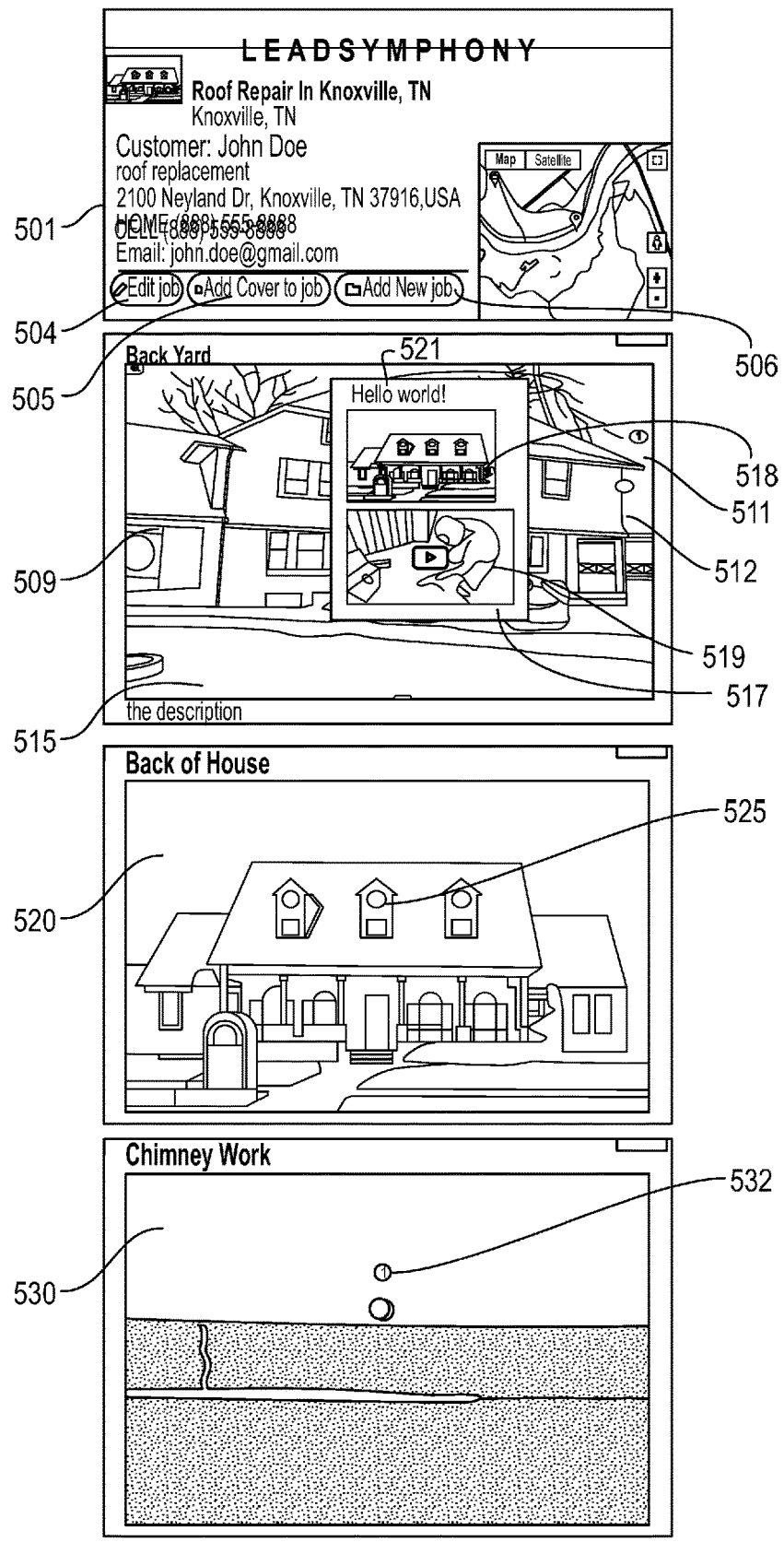
FIG. 5 is a screen capture of a website depicting an administrator user interface that provides the function of the cover photo of FIG. 3 with a different pin accessed by a viewer and a video presented.

Now turning to FIG. 5, a job view 500 is depicted as accessed by an individual with administrative privileges to a website. FIG. 5 includes a section for customer information 501, edit functions, including edit job function 504, add cover to job function 505 and add new job function 506. Depicted below the edit functions are cover images of back yard 509, back of house cover picture 520 (that depicts the front of a house) and a close-up image of "Chimney work" 530. Image 509 includes a number of pins such as pins 511, 512, 515. Pin 511 is depicted with its associated container 517, and container 517 further includes images such as 518 and 519 and text 521 "hello world." Image 520 includes a single pin 525 and image 530 has pin 532 provided thereon.

Figure 6:
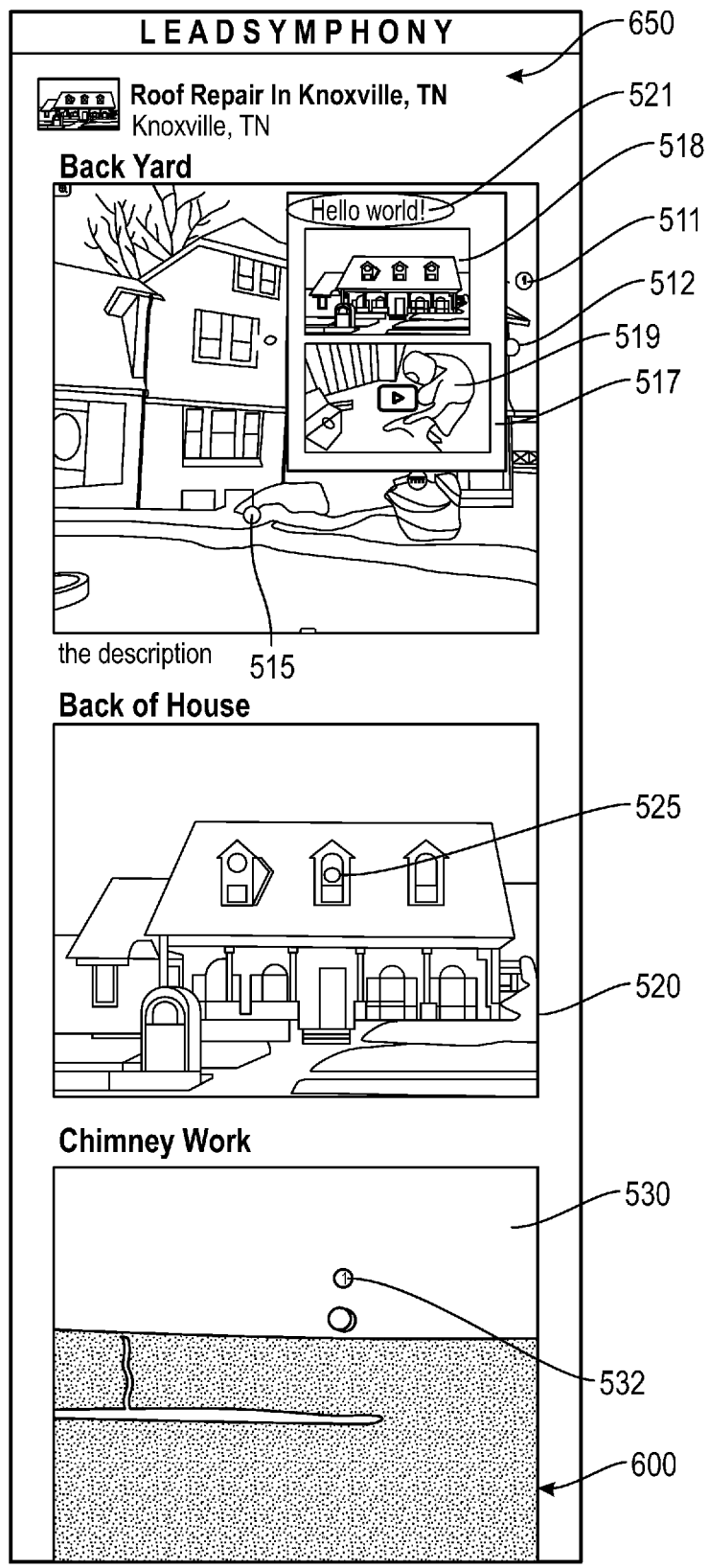
FIG. 6 is a screen capture of a website that includes the pin feature of the invention as published and made available to the public.

Now referring to FIG. 6, a screen capture 600 of a public webpage that corresponds to the web page of FIG. 5. is shown and depicts exemplary views of a job as published and available to the public for review. In this view anyone who accesses the page can access containers associated with pins such as container 517. In this view, the job title 650 is published but the customer information is not made public. The pins and job views are otherwise the same as those illustrated in FIG. 5.

Figure 7:
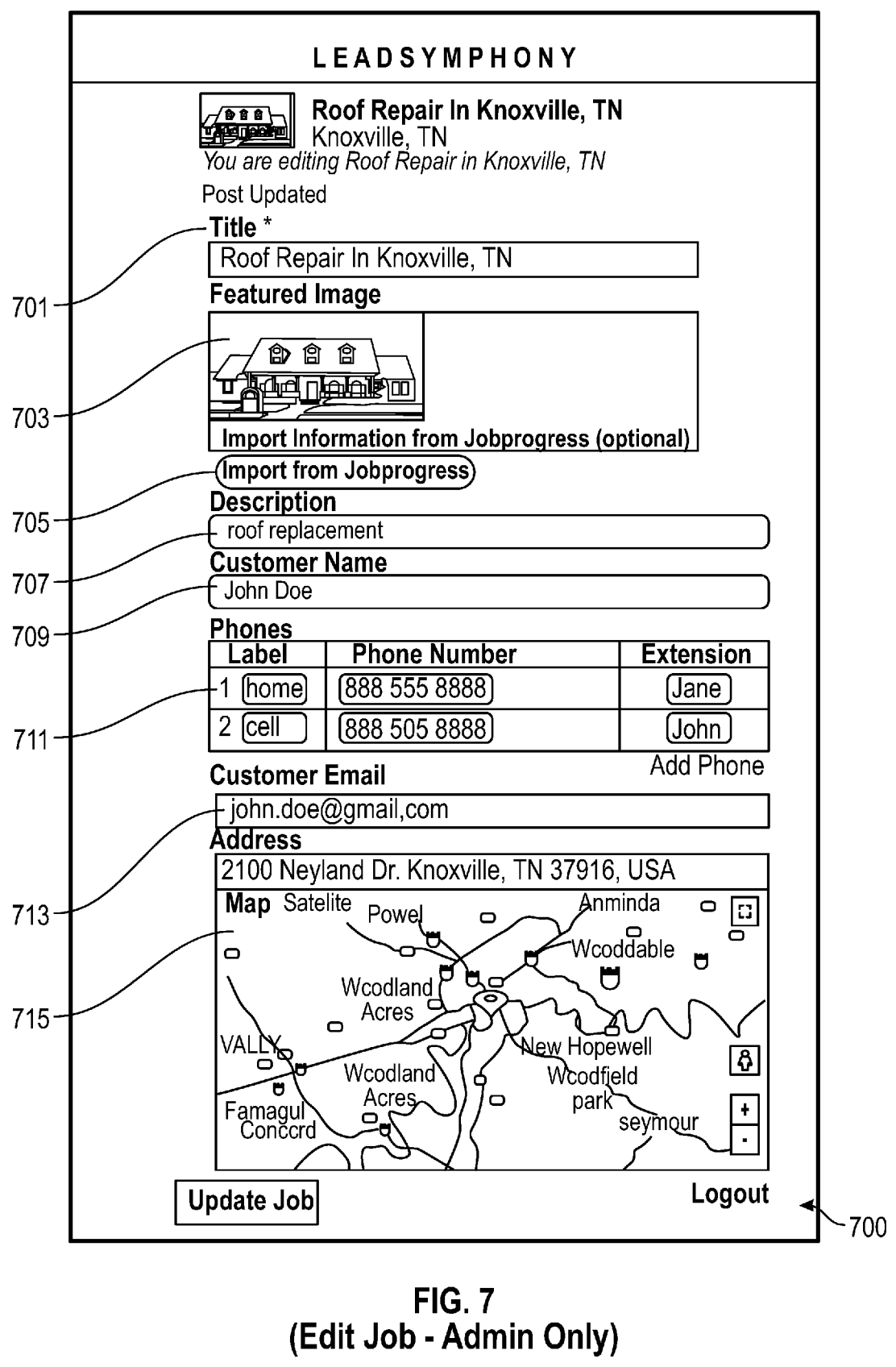

FIG. 7 depicts the screen capture of an edit page, accessible by an individual with administrator privileges. From this interface an administrator can provide data in the following fields, a title to a job 701, import featured images 703, provide a description of the job 707, input the customer name 709 and phone number 711, an email 713 and an address 715. In this embodiment the address is depicted on a map 716. When the address is entered a map depicting the location of the job can be displayed at location 715.

Figure 8A:
FIG. 8A is a dashboard displayed to a website administrator to allow for the creation of a new cover image.

FIG. 8A depicts an editing access page accessible to an administrator to affect the addition of a new cover to an existing job. The page includes a data entry field for a title, a link to the user's images files 855 and an upload function 856 to add a new cover to the job.

Figure 8B:
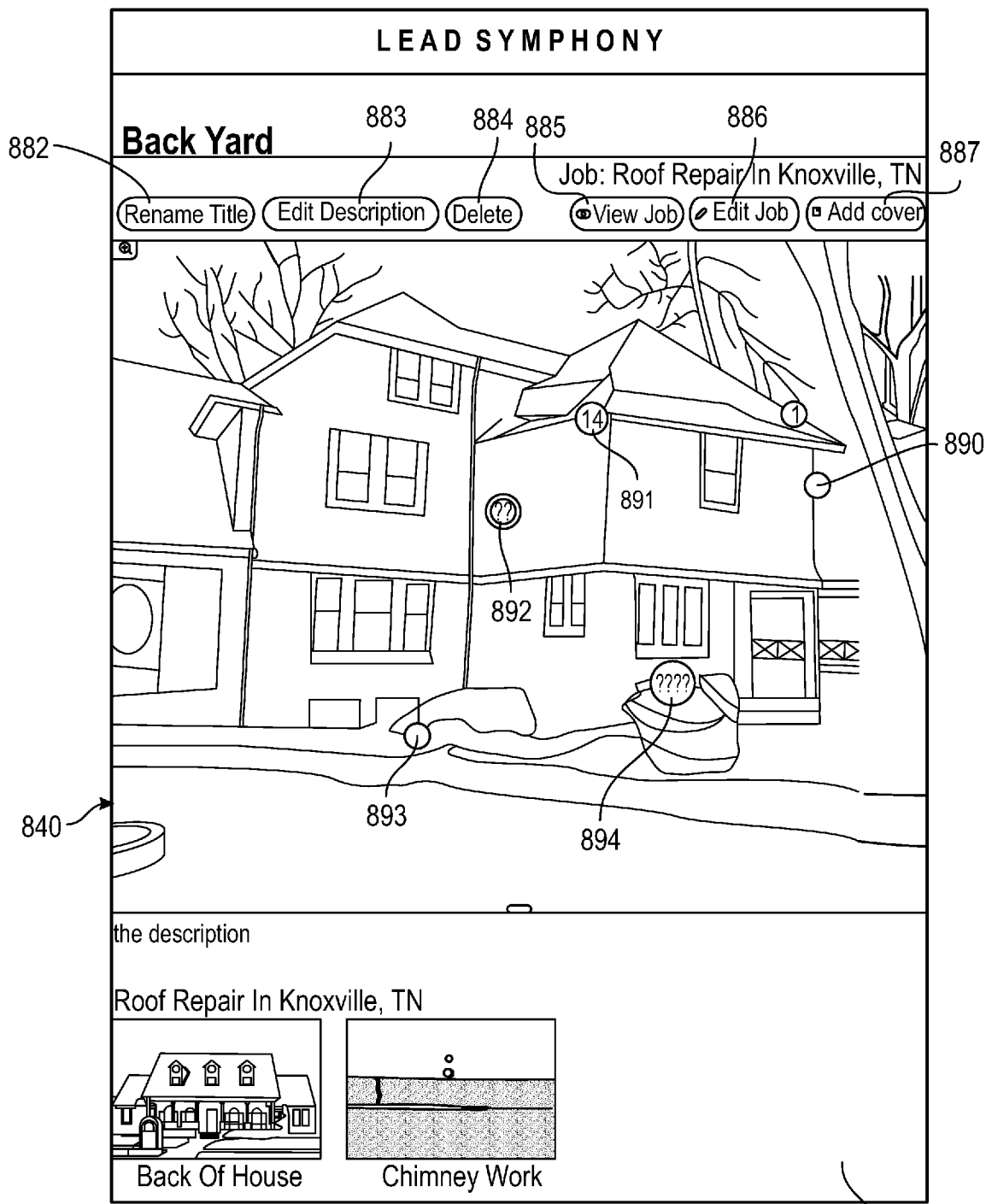
FIG. 8B is a dashboard displayed to a website administrator that displays numerous functional options available.

FIG. 8B depicts an editing page 850 accessible to an administrator to affect the editing of a cover. The functions accessible include "rename title" of the cover 882, edit of a description of the cover 883, delete the cover 884, view of the job 885, edit the job 886 and add a new cover 887. Image 840 includes pins on the image including pins 890, 891, 892, 893 and 894 each of which identify containers that may be opened.

Figure 9:
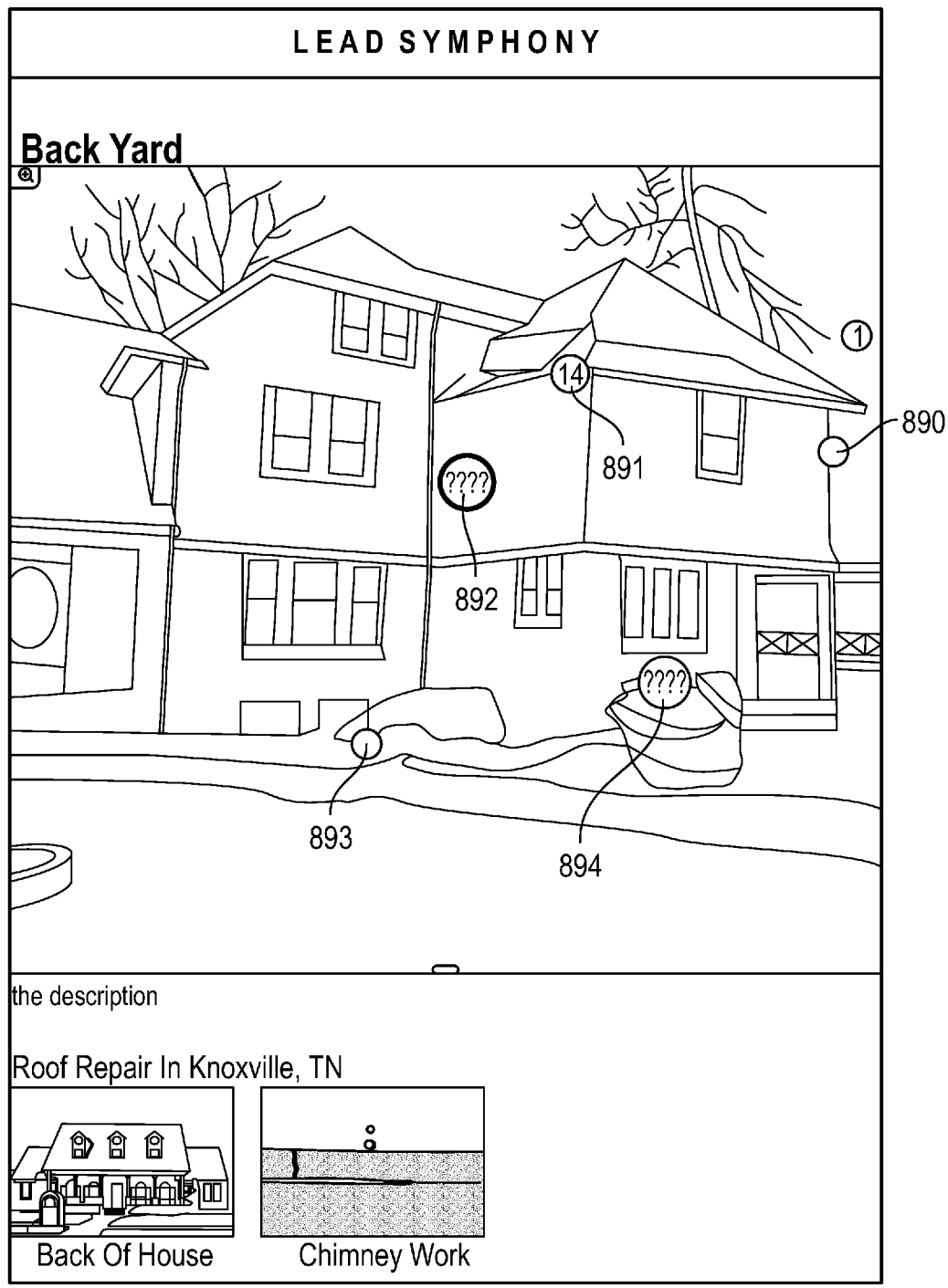
FIG. 9 is a screen capture of website cover photo including a number of pins as displayed and published.

FIG. 9 depicts a published website wherein each of the pins 890, 891, 892, 893 and 894 are depicted and accessible by website visitors. This is a public view of the image 840 from FIG. 8B after edits have been made and the page is published.

Figure 10:
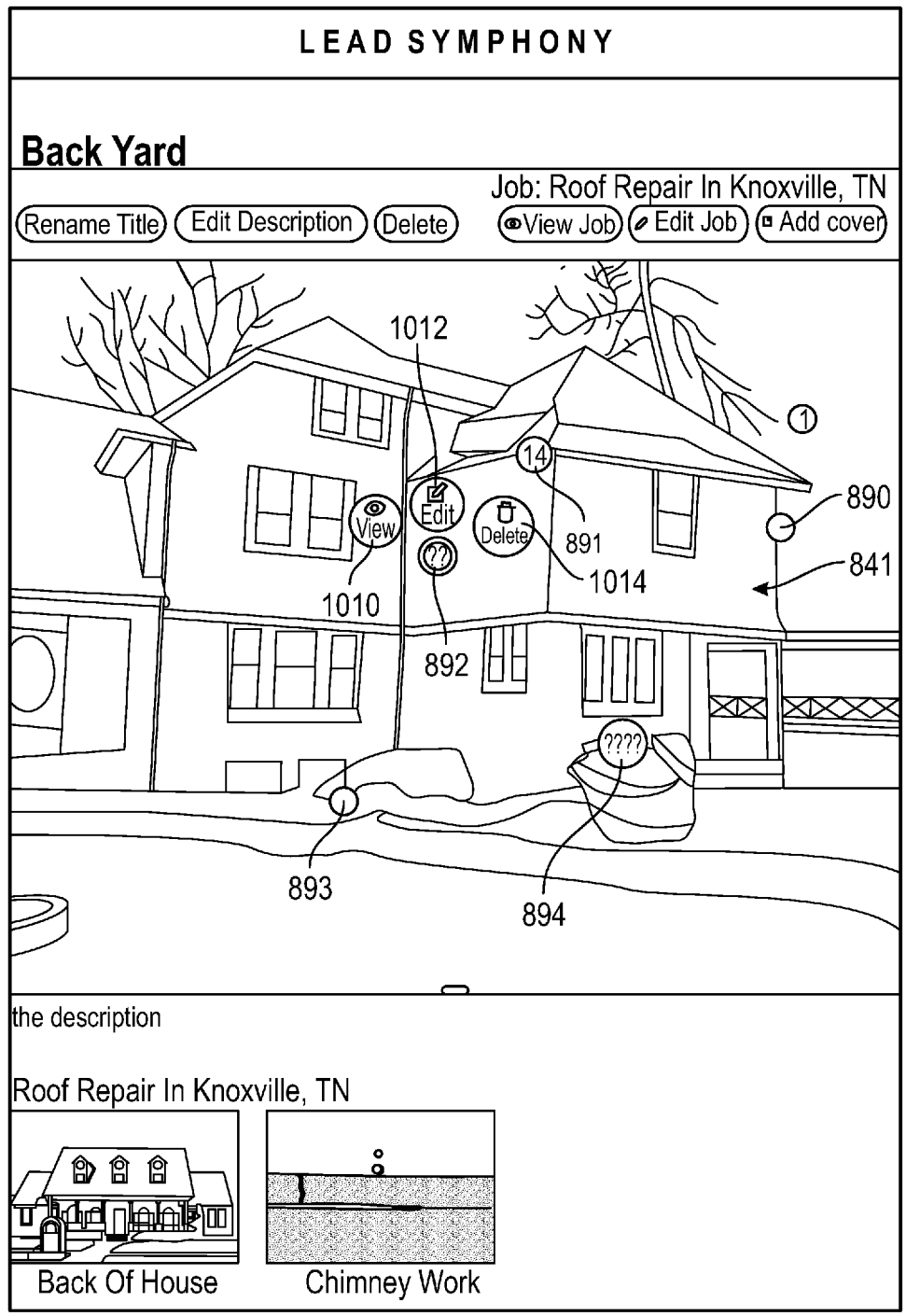
FIG. 10 is a screen capture of website dashboard for administrators that include accessible functions for the creation, deletion and editing of pin containers.

FIG. 10 is a further screen capture 841 of an administrator's view and includes a view function 1010, to view content associated with pin 892, an edit function 1012 to edit the content associated with pin 892 and a delete function 1014 to delete pin 892.

Figure 11:
FIG. 11 is a screen capture of website dashboard for an administrator for moving a pin.

FIG. 11 depicts a screen capture of an administrative page that allows the pin to be moved to an image. Here pin 892 is illustrated to be moved from position A to position B. According to the invention, the pin can be dragged to any location on an image so as to associate the pin with an image feature.

Figure 12:
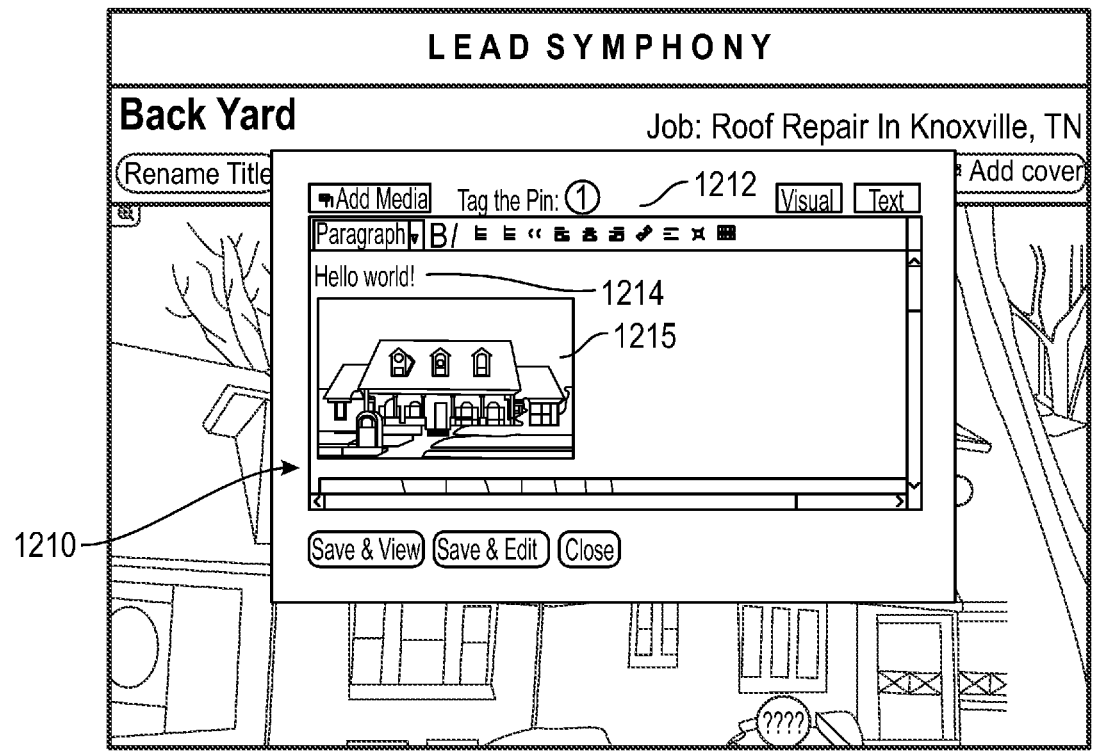
FIG. 12 is a screen capture of website dashboard depicting a field for administrators to tag and create pin content.

FIG. 12 depicts a screen grab 1210 that depicts a pin editing function wherein the pin can be provided with an alpha-numeric identifier 1212. Text 1214, images 1215 and video (not shown) may be uploaded to the container associated with the pin.

Figure 13:
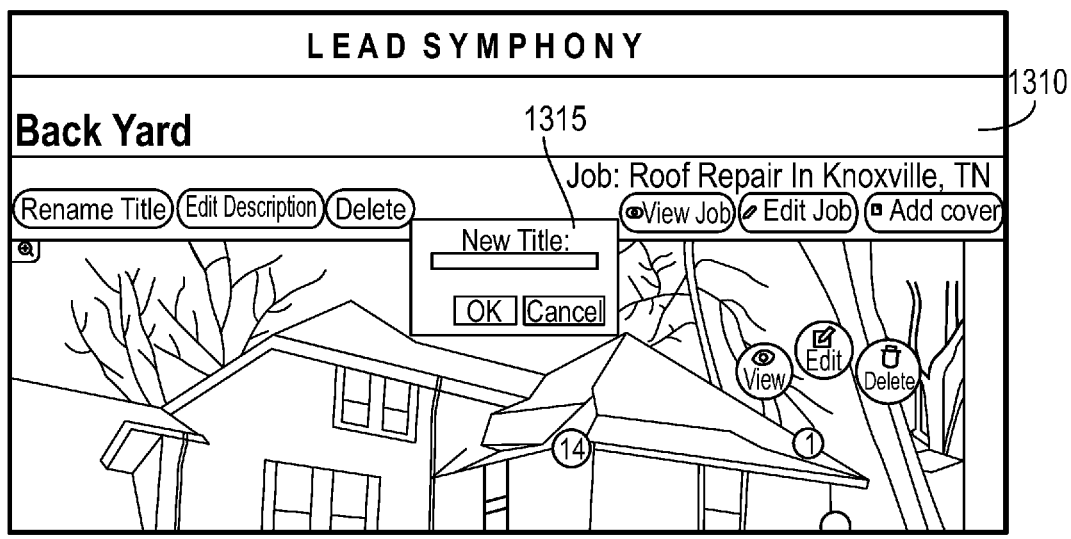
FIG. 13 is a screen capture of website dashboard depicting a field for renaming a cover title.

FIG. 13 illustrates an administrator page 1310 wherein a new title can be added to an existing cover by accessing field 1315.

Figure 14:
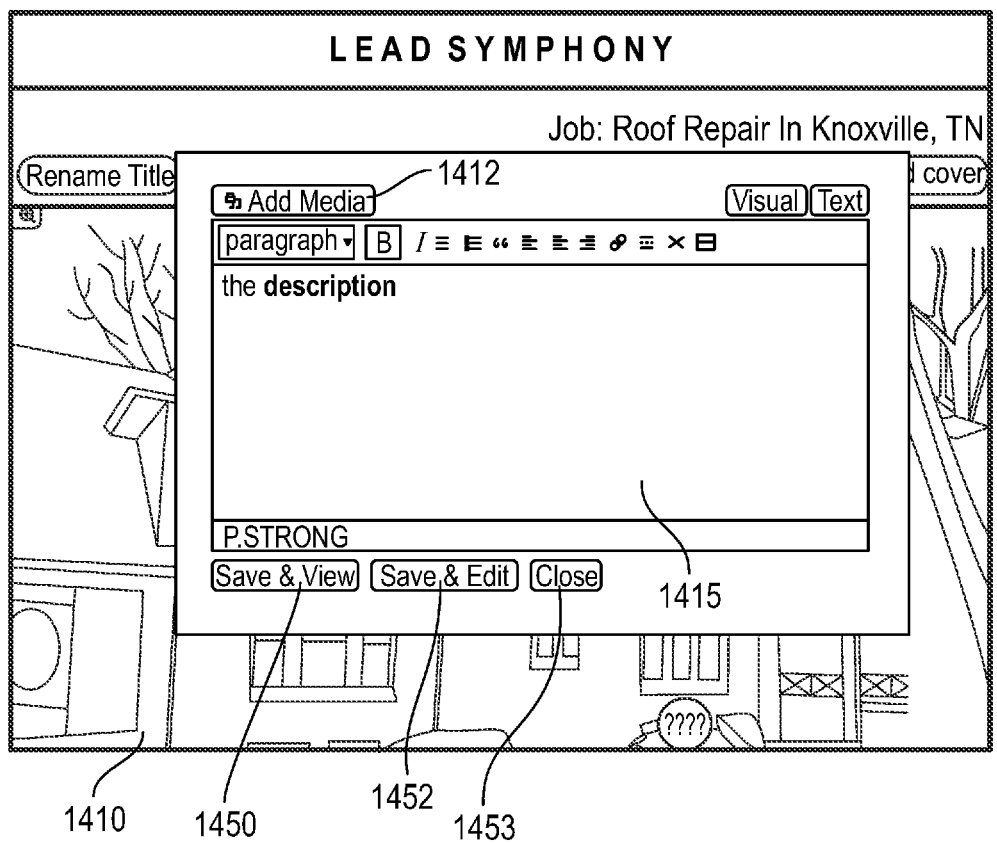
FIG. 14 is a screen capture of website dashboard depicting data entry for the creating of content in a container.
Figure 15:
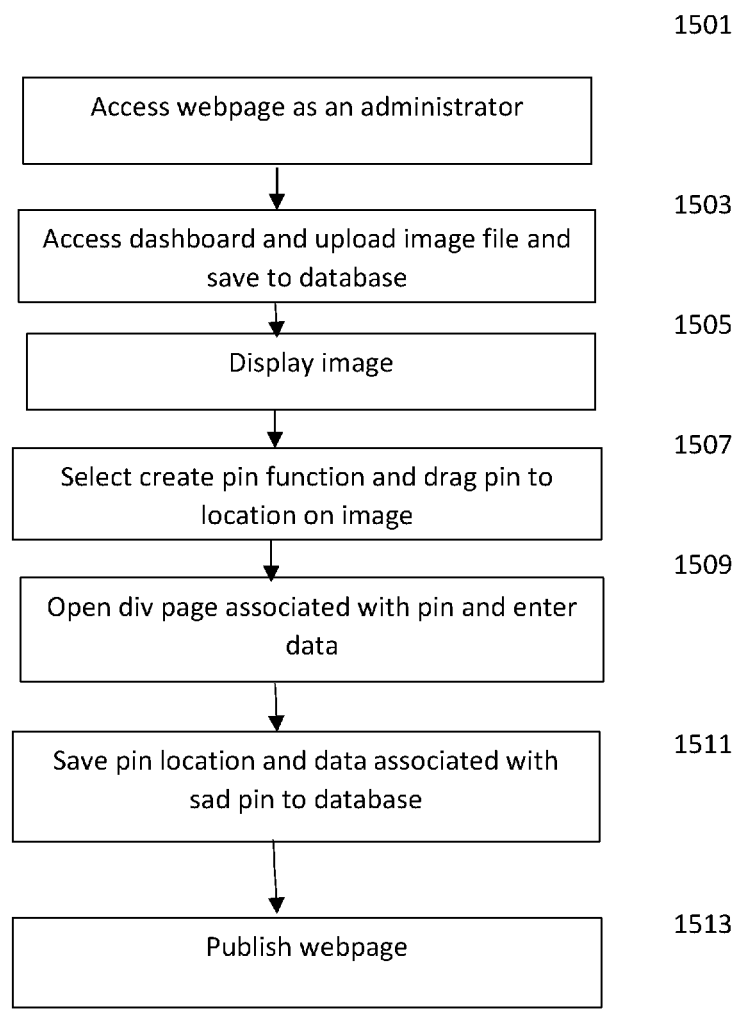
FIG. 15 is a flow chart depicting a method of the invention.

FIG. 14 is further screen view of an administrator page 1410 of a cover that provides various functions available to an administrator including "save and view" 1450 "save and edit 1452 and close 1453. The input page includes an add media function 1412 and a field to add description to a cover.

As explained herein, each of these tags represents a page division or window that can be accessed by the mouse pointer to access information about the location identified by the pin.

The present invention is therefore directed to system to present information and methods to create webpages with the pins as described above. All of the necessary code required to create and locate a pin and its associated page div information can be selected by a user and then be dragged to a location on a web page. Further, the present invention allows the pin to be directly overlaid on an image displayed on a webpage and be associated with additional photographs, text and video links. By providing the plugin code elements, any web site owner with administrative privileges can quickly and easily create such links and thereby enhance a conventional website image.

While the term "pin" is used to describe the location of the embedded code, it may also be referred to a marker, or JavaScript button. The pin or JavaScript button tag may be provided with instructions to make the tag visible or invisible on the website. The JavaScript tag is accessed to open a window—in JavaScript, the graphic user interface will hide the HTML div tag that comprises the container or mini-window in which a data may be uploaded, entered and then stored. The container can be provided with data including text, images and videos. The custom JavaScript button or pin that that is created can be activated by the website viewer to open by a mouse click.

To create the pin, first an image or video is uploaded to the server and has meta data saved to the MySQL database with PHP. Next, JavaScript is used to place a pin on a photo. The location of the pin is determined by computing the original size of the photo and determining its ratio. The coordinates of the pin are then calculated in relative positions to the image's left and top margins. Once JavaScript is used to place the pin, PHP takes over and saves the pin coordinates and information to the database.

In order to access the content associated with a pin, JavaScript is again used to place the data into the container using data which is being served by PHP from the database. A similar process is followed when a pin is edited, moved, or deleted. The output from PHP in pages and templates and from JavaScript functions, is rendered in HTML which has cascading style sheet ("CSS") added for design.

A further feature disclosed relates to the manner that the pin placement is determined. According to an embodiment, the pin location placement step does not use an absolute horizontal and vertical placement value, but rather it is based on the original image or video size when first created, and then a ratio is determined of where the pin was placed so when the pins are viewed on smaller or larger devices and the picture or video is then viewed in a larger or smaller format, the relative placement of the pin always remains in the same place no matter what device it is being viewed on. If a pin placement is changed by the end user, the ratios are re-calculated.

Another feature is that the embedded code can include a timing function that is used to open and close the containers associated with pins at predetermined times. For example, a first pin located on a displayed image may open for 10 seconds and close. Next, a second pin on the image may open for a designated period of time and then close, and so on. The sequence and duration of time that a container is opened, and the content therein displayed for each pin is determined by the user. This sequence offers a unique and novel way of guided information exchange.

In an embodiment, the webpage may only be viewed in a predesignated automated sequence. In alternative embodiments, the sequencing can be paused, much like a video, so that the end user can pause the sequence to view something of interest and or go back over a specific pin and view the associated content again. The ability to have the story pin line playing in a designated sequence and the ability for the end user to interrupt the sequence and open any pin displayed out of the designated sequence order to allow a user to review content that may be more relevant to the display is also an available option. The open set size of the pin information can also be controlled by the creator so that several pins and their content can be open at once, or a pin's content can be displayed on a full screen thereby making it easier to view the content.

In the context of pins being overlaid on or in a video, not only can the duration of opening and closing of the pin be set on the video, but the pin can also be set to open at a predetermined time as the video is played. For example, a pin may be programmed to display at a time after 47 seconds has elapsed in the video and open for a duration of 15 seconds at a specific location on the video at that time. These features allow for a much more granular and segmented manner to take in information so that the end user is not overwhelmed and it allows a user to explore parts of the information in much more detail as they selected rather than a static display that requires all users to consume the information in a preset manner. Accordingly, the system allows an end user determines how, how much, and when they consume information.

An exemplary application of the timing feature is used with a website that displays the exterior image of a house that has been listed for sale. The images have numerous pins that open up on a timed basis, each of which show a video along with an explanation of features in text for each designated element of the home in a corresponding location, for example, a first video is accessed from a pin located on an exterior window of a master bathroom. Next a pin on a second window is accessed in a sequential order, and the sequence continues until each pin is opened and its associated content is displayed. The images may include a front, back, left side, right side main picture, or an aerial view. This gives the viewer a much more relevant view of the layout of the home.

All SEO and schema for Google and other search engines will be created around these web pages that are created by the system. These stories, consisting of the annotated photographs or videos are also useful for customer engagement at a point of sale As described above, a first example of a useful implementation in connection with construction industry such as improvement contractor such as roofing, siding, gutter, and restoration contractors where the system allows the contractor to demonstrate their workmanship and explain the nature of the project. The system and method can also be used to update a customer, staff or other interested parties on job progress. The system allows a user to quickly upload pictures, video, audio, and text embedded within a reference picture.

Using the system and methods described, the nature of the work projects can be clearly communicated with reference to images, multimedia and text. The photographs, videos and text can be uploaded directly to Word Press websites from a mobile or desktop application. The systems and methods enable users to create "stories," which essentially document and explain projects as they progress on a job site during the project duration. They can be published to a website, shared with a customer or provided to internal staff to improve communication, instruction and assist with the defining the scope of work.

In an embodiment, a cover image is uploaded to the Word Press web site that container the integrated tool that is a reference image for a property of job site. The image may be an aerial photograph of the property or elevations. As described herein, each story can have multiple images. Each pin can be provided with further details to the cover image or images in the form of text, images, and video; and each image can be iteratively provided with additional pins as may be appropriate or desired. The system and method therefore allow for more detailed information of points of interest of a property. There may be multiple pins on a cover image and the pins will be number to tell the sequence of the story. When clicked or "tapped on" the pins open up and display their contents when selected by the user. A specific pin may also be shared via a link and the pin will be open when the viewer clicks on the link to help show and communicate a specific piece of information.

As used herein, a person granted all editing capabilities including publishing stories to the web pages and posts is referred to as the administrator. An editor, as used herein, is any person that is permitted to contributor who can upload images, videos, audio, text, to a web page in the form of cover images and pins. An editor can create new stories and customer profiles but may not delete other stories or projects.

In a further contemplated application, a home advertised for sale on a web page may have a series of tagged images that allow the viewed to access more detailed information relating to features. For example, a photograph of kitchen may include tags for the appliances and, by accessing the tags the viewer may access additional detailed information each such as the make of the appliance and its features. An image of a fireplace may be provided with a tag that allows web age viewer to learn in the fireplace is gas or wood burning and the information such as the last inspected or cleaned.

In a further contemplated embodiment, an image is provided that depict merchandise items and pins are associate with each item. A web page viewer can access each pin on the image and be provided with a display of information relating to the item in a container which may include additional images, text, video and audio files. Links can be provided to allow the viewer to purchase the items The plugin disclosed will work with all standard WordPress themes. In an embodiment the container is created in JavaScript and, a user can therefore easily integrate JavaScript instructions at any location on the page by simply dragging and dropping the pin User Interface at a desired location on the page. The plugin makes the creation of containers or JavaScript div pages for people that have no experience coding and allows the rapidly creation of numerous such pages Once these images and preliminary pages are created (by field technicians with editor software privileges) the pages can be published to the user's website. An administrator can then publish the stories as either as posts, or WordPress web pages.

In the present invention, links are created that are associated with a particular "pin" or symbols that is created on a document, and in this case a Word Press environment wherein a pin is located on an image such as a photograph or drawing. Pins are located on the image at any relevant location. In embodiments, pins may also be provided with a symbol, a number or graphical information including text that may further explain the nature of the pin and associated links. Links contained in the blocks can direct users to further data, or direct users to open other pins to highlight specific portion of a project. When the user has competed access, the user closes that pin and can view others.

A job or project can consist of multiple cover photos that have their own pins. The present tool that is disclosed allows pages to be created and published in only a few minutes while actively working on a job site without having to go through the cumbersome WordPress editor. Pins can be moved around to specific locations as needed.

According to a process that used with the system to improve content integration to a webpage, a first the process determines whether the user is new or has a pre-existing account an associated credentials. Next, a user is presented with input fields to enter a username and password, or alternatively is presented with a link to allow new users to enroll or register. If the user is a new user without a pre-existing account, then the user is directed to a registration process. The registration process collects information from the user to create an account, such as personal information and about a relevant business or project. The registration data may include an account username and password, along with user identification information that is stored in an array or a database, such as MySQL, which is then stored on a hard drive, portable electronic media, cloud storage, etc.

Authorized users access an account using a log in process wherein user's credentials are entered and verified by comparing the inputted credentials against the corresponding account credentials in the database that stores all the account information. After the user has been logged into the account, the user is presented with a dashboard, instruction page, or home page. Next the user may select to create a new project or access an existing project that has been previously created. An example of a project is a home improvement or home repair job, such as a roofing project. Referring back to FIG. 1, each job project is provided a title and a landing page that comprises a photograph of a building, such as a residential home. In other embodiments the job may be commercial project such as a build-out, a landscaping project, a swimming pool, or other construction project such an outbuilding, boat house or shed.

The system and method allow a user to create interactive pins or markers and place then at locations on the image of the respective project next to image features. Pins may be associated with particular features of the project that are depicted in the image. For example, a pin may be positioned next to a chimney on the image of a house.

Content is provided by the user to a data entry field relative to the inter-active pin. The user may enter text, or upload files such as additional photograph or images. Uploaded photographs, accessible through a first interactive pin can also be provided with interactive pins. After uploading or creation, the information is saved and published. After publication, anyone may access the website and select the interactive pins to be access container or page divisions and be provided with more information about the specific features that is depicted in pin.

In a further contemplated embodiment, the system and methods of the invention is used for the sale and marketing of homes. In current web-based marketing systems, such as those offered by Zillow, Trulia and Redfin, information webpage is provided that typically includes one or more base photograph, a links to a series of additional photograph, a brief summary of the property, a map of the property, a street view and links to additional. Facts and features, the home value, pricing and tax history. Users can then access the collection of photographs to see details of the property.

The present invention can be adapted for use for home marketing websites and improve the ability of the seller to communicate relevant information to prospective purchasers. Home seller can provide informational pins on each of the photographs provide to explain particular home features. For example, in a kitchen photo, an appliance can be pinned and information on the year of purchase, warranty information and other features (size, brand, etc.).

The content provided in the system as described above is readily adaptable to be adjusted, edited and further customized. After gaining access to the content on an account, a user or content provider may choose to add new photos, text or accessible files. For example, as a home improvement job or construction job progresses, the contractor can update the job page to document progress. Such updates can be particularly useful to support bank draft or to demonstrate progress to clients that may not be able to visit a job site.

In a further contemplated embodiment, an automobile restoration shop or body shop can show the progress of work on a project from start to finish, by uploading a series of photographs, each of which may include interactive pins, located on parts or features of the depicted automobile to explain the nature of the work performed, including linking to additional photographs and other features of the respective project.

For each account holder, the system and method can easily be expanded to accommodate multiple separate and independent project or jobs. On the system platform, there can be multiple account holders, and each may be involved in different and diverse projects and activities. The embodiments described herein provide distinct improvements to computer technology, namely providing a platform that allows for the integration of content in order to enhance user experience. Using the system of processes as disclosed allows for a user to relatively smoothly and simply (e.g., "seamlessly") upload content, such as photographs and images from the user's files and then organize and annotate such content, and then publish such content to allow third parties to access the materials.

In some embodiments, the administrative framework may comprise any content-management system or framework. For example, the administrative framework in the primary embodiments described above uses WordPress. In other contemplated embodiments the administrative framework may comprise Drupa or Apache Sling. The content-management framework may dictate the additional features available that are not present in a traditional content-management framework.

In yet a further embodiment, the pin or marker may provide a link to a video file that has been uploaded by a user or, alternatively, may provide the address of the video on a website site hosted by a third party such as You Tube.

Access to content can be controlled in multiple ways. For example, a visitor can only be allowed to access a website after the user has created an account and has been approved. Other websites may be publicly accessible. A visitor may also be restricted based on content—access to some content is allowed initially but not later, later but not initially, etc. Access can be granted and controlled with respect to progress or access of other users. Accordingly, some users may be given access only when other users also have access, or access can be doled out exclusively to some but not others. Triggers and constraints can depend on input from the content provided.

While the foregoing is directed to various embodiments, other and further embodiments and applications may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry. The various features and processes described above may be used independently of one another or combined in various ways.

All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

As used herein, conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

PHP stands for Hypertext Preprocessor which is a server-side, scripting language that is used to develop Web applications. It can be embedded in HTML and is used for the creation of dynamic web pages and database applications as it can interface with MySQL and other databases. PHP files can contain text, HTML, CSS, JavaScript, and PHP code and PHP code is executed on the server, and the result is returned to the browser as plain HTML. HTML stands for Hypertext Markup Language and is used for website creation. The way in which content is displayed in a browser is depicted through HTML. CSS stands for Cascading Style Sheets. CSS describes how HTML elements are to be displayed on screen, paper, or in other media. CSS saves a lot of work. It can control the layout of multiple web pages all at once. External stylesheets are stored in CSS files. AJAX is Javascript Asynchronous Javascript and XML and is a combination of a browser built-in XMLHttpRequest object, that requests data from a web server, and JavaScript and TML Dom to display or otherwise use the data received. In an alternative embodiments JavaScript Object Notation ("JSON") is used to read data from a web server, and display the data in a web page. Axios is a popular, promise-based HTTP client that sports an easy-to-use API and can be used in both the browser and Node.js and used to fetch or save data.

The term "comprising" as used herein and in the appended claims should be given an inclusive rather than exclusive interpretation. For example, a general-purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Additional and alternative implementations are included within the scope of the embodiments described herein in which steps, elements or functions may not be included or may be executed in a different order from that shown or discussed, and as would be understood by those skilled in the art.

Many variations and modifications may be made to the above-described embodiments, the elements of which are among other acceptable examples. All such modifications and variations are intended to be included herein within the scope of this disclosure.

The invention claimed is:

1. A method to create and display content on a website comprising;
    accessing a website having webpages;
    accessing an application on said website for uploading an image file to a server that includes image metadata;
    uploading said image file and file information relating to said image file;
    saving said image file to a database with a scripting language;
    displaying an image from said image file on a webpage from the website using a browser to create a display;
    accessing a JavaScript application programming interface that allows a user to select a pin from a first region on said webpage, drag said pin, and place said pin at a second region of said webpage, said second region comprising a location associated with an image feature on said image;
    capturing vertical and horizontal dimensions of said image to compute a ratio for said image;
    capturing an original size of said image;
    determine X and Y pin coordinates for said pin location based on the captured image size and ratio for said image;
    saving said pin coordinates and said ratio with said image file to said database using the scripting language;
    associating a div element with said pin; and
    wherein, upon accessing said pin, said JavaScript application programming interface opens and displays said div element and allows said user to enter data into a displayed data entry field;
    entering data in said div element;
    saving said entered data in said database; and
    publishing said webpage, wherein subsequent viewers of said webpage can view said image having said pin provided thereon and access said entered data associated with said pin that is served by PHP from said database by activating a function in response to a selection of said pin.

2. The method of claim 1 wherein said image file is selected from a group comprising of JPEG, TIFF, RAW, PDF, Tif, Gif, BmP Jpeg, Png and pdf.

3. The method of claim 1 wherein said div element comprises a container wherein said container has predesignated properties and can be accessed by said user and further comprising a data entering step wherein said user can enter data in said container and save said data and when said published webpage is opened said method further comprising the steps of automatically opening a first container associated with a first pin and displaying content therein for a predetermined period of time, a further step of closing said first container after said predetermined time period has elapsed, a further step of opening a second container associated with a second pin and displaying said content associated with said second container.

4. The method of claim 3 wherein a request from said div element to said database is in Ajax or Axios.

5. The method of claim 3 wherein said entering data step by said user further comprises the steps of opening said div element in HTML and a JavaScript application opens a JavaScript Object Notation file format comprising a plurality of data fields, entering data, and saving said data to said database.

6. The method of claim 5 wherein said communication between the div element and said database uses JavaScript Asynchronous JavaScript and XML ("AJAX").

7. The method of claim 3 wherein said data entered by a user is selected by said user from a group comprising text files, image files, a html links, and video files.

8. The method of claim 7 further comprising, step of opening said div element, editing data in said container to create updated data, and saving said updated data.

9. The method of claim 3 wherein output from PHP comprising pages, templates, JavaScript functions, is rendered in HTML including CSS added for design.

10. The method of claim 3 wherein an administrative framework for the webpage comprises Word Press.

11. The method of claim 3 wherein an administrative framework for said webpage comprises Drupa or Apache Sling.

12. The method of claim 3 further comprise providing file information relating to said image file.

13. The method of claim 1 wherein said application that communicates with said web server comprises XML.

14. The method of claim 1 wherein in response to a subsequent viewer opening said webpage method proceeds with a first step of opening a first container associated with a first pin and displaying content for a predetermined period of time, a second step of closing said first container after a period of time has elapsed, a third step of opening a second container associated with a second pin and displaying said content associated with said second container.

* * * * *